US009444825B2

(12) United States Patent
Yoshida et al.

(10) Patent No.: US 9,444,825 B2
(45) Date of Patent: Sep. 13, 2016

(54) CONTINUOUS USER AUTHENTICATION

(71) Applicant: Empire Technology Development LLC, Wilmington, DE (US)

(72) Inventors: Naofumi Yoshida, Yokohama (JP); Shuichi Kurabayashi, Fujisawa (JP); Kosuke Takano, Naka-gun (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/456,511

(22) Filed: Aug. 11, 2014

(65) Prior Publication Data

US 2016/0044047 A1 Feb. 11, 2016

(51) Int. Cl.
*H04L 29/06* (2006.01)

(52) U.S. Cl.
CPC ............... *H04L 63/12* (2013.01); *H04L 63/08* (2013.01); *H04L 63/10* (2013.01)

(58) Field of Classification Search
CPC ..... H04L 63/00; H04L 63/08; H04L 63/083; H04L 63/0861; H04L 63/0876; H04L 63/1416; H04L 63/1475; H04L 63/1483; H04L 63/30; H04L 63/302; H04L 63/306; H04L 63/308
See application file for complete search history.

(56) References Cited

U.S. PATENT DOCUMENTS

| 5,754,737 | A  | * | 5/1998  | Gipson ............... G06F 17/276 706/11 |
| 5,900,004 | A  | * | 5/1999  | Gipson ................ G06F 17/21 715/236 |
| 6,377,965 | B1 | * | 4/2002  | Hachamovitch ...... G06F 17/276 715/203 |
| 8,041,592 | B2 | * | 10/2011 | Lopez .................. G06F 21/552 235/382 |
| 8,051,468 | B2 |   | 11/2011 | Davis et al. |
| 8,621,345 | B2 | * | 12/2013 | Selby .................... G06F 21/31 715/271 |
| 2003/0112942 | A1 | * | 6/2003  | Brown ............... G06Q 20/4037 379/196 |
| 2005/0183143 | A1 | * | 8/2005  | Anderholm ............. G06F 11/32 726/22 |
| 2008/0052377 | A1 | * | 2/2008  | Light ................... G06Q 10/107 709/218 |
| 2008/0098456 | A1 |   | 4/2008  | Alward et al. |
| 2008/0222712 | A1 |   | 9/2008  | O'Connell et al. |
| 2010/0064345 | A1 | * | 3/2010  | Bentley ................... G06F 21/31 726/3 |
| 2010/0131447 | A1 | * | 5/2010  | Creutz .................. G06F 17/276 706/52 |
| 2010/0306845 | A1 | * | 12/2010 | Vaithilingam ....... G06Q 10/107 726/23 |
| 2012/0296627 | A1 | * | 11/2012 | Suzuki .................... G06F 17/27 704/2 |
| 2013/0144822 | A1 | * | 6/2013  | Zhang ............... G06F 17/30943 706/46 |
| 2014/0058725 | A1 | * | 2/2014  | Long ..................... G06F 3/0236 704/9 |
| 2014/0129933 | A1 | * | 5/2014  | Eleftheriou ........... G06F 3/0236 715/702 |
| 2014/0289808 | A1 | * | 9/2014  | Blanke .................. G06Q 20/42 726/4 |
| 2015/0032505 | A1 | * | 1/2015  | Kusukame ......... G06Q 30/0201 705/7.31 |
| 2015/0242605 | A1 | * | 8/2015  | Du ......................... G06F 21/32 726/7 |

OTHER PUBLICATIONS

"Apple Customer Privacy Policy," Accessed at http://web.archive.org/web/20140709021352/https://www.apple.com/legal/privacy/, Accessed on Jul. 11, 2014, pp. 1-4.

(Continued)

*Primary Examiner* — Eric W Shepperd
(74) *Attorney, Agent, or Firm* — Brundidge & Stanger, P.C.

(57) ABSTRACT

Technologies are generally described for authenticating a user account. In some examples, a method performed under control of a server may include providing a communication service to an end device; receiving, from the end device, a text input, while providing the communication service; and authenticating a user account associated with the end device, based on the received text input, while providing the communication service.

16 Claims, 6 Drawing Sheets

(56) References Cited

OTHER PUBLICATIONS

"Federated identity," Accessed at http://web.archive.org/web/20140701100446/http://en.wikipedia.org/wiki/Federated_identity, Accessed on Jul. 10, 2014, pp. 5.

"Information that Google collects," accessed at http://web.archive.org/web/20140702063534/http://www.google.com/intl/ja_jp/policies/privacy/#related, Accessed on Jul. 10, 2014, pp. 7.

Crawford, H. A. "A framework for continuous, transparent authentication on mobile devices," School of Computing Science, pp. 209 (2012).

Manber, U. and Myers, G., "Suffix arrays: a new method for on-line string searches," In Proceedings of the first annual ACM-SIAM symposium on Discrete algorithms, vol. 90, No. 319, pp. 319-327 (1990).

T. Baba, S., "Tracing network attacks to their sources," Internet Computing, IEEE, vol. 6, No. 2, pp. 20-26 (2002).

Y. Takei. et al., "Detecting and Tracing Illegal Access by using Traffic Pattern Matching Technique," Institute of Electronics, Information and Communication Engineers (IEICE) Transaction B (Communications Society), vol. J84-B, No. 8, pp. 1464-1473, Aug. (2001).

\* cited by examiner

| ID | WORD 1 | WORD 2 | ... | WORD M |
|---|---|---|---|---|
| ID 1 | 2 | 3 | ... | 5 |

| ID | WORD 1 | WORD 4 | ... | WORD N |
|---|---|---|---|---|
| ID 2 | 5 | 2 | ... | 10 |

| ID | WORD 1 | WORD 2 | ... | WORD M |
|---|---|---|---|---|
| ID 1 | 1 | 3 | ... | 5 |

| ID | WORD 2 | WORD 5 | ... | WORD N |
|---|---|---|---|---|
| ID 2 | 1 | 2 | ... | 3 |

| ID | WORD 1 | WORD 2 | ... | WORD M |
|---|---|---|---|---|
| ID 1 | 2 sec | 3 sec | ... | 1 sec |

| ID | WORD 4 | WORD 5 | ... | WORD N |
|---|---|---|---|---|
| ID 2 | 1.5 sec | 2 sec | ... | 3 sec |

⋮

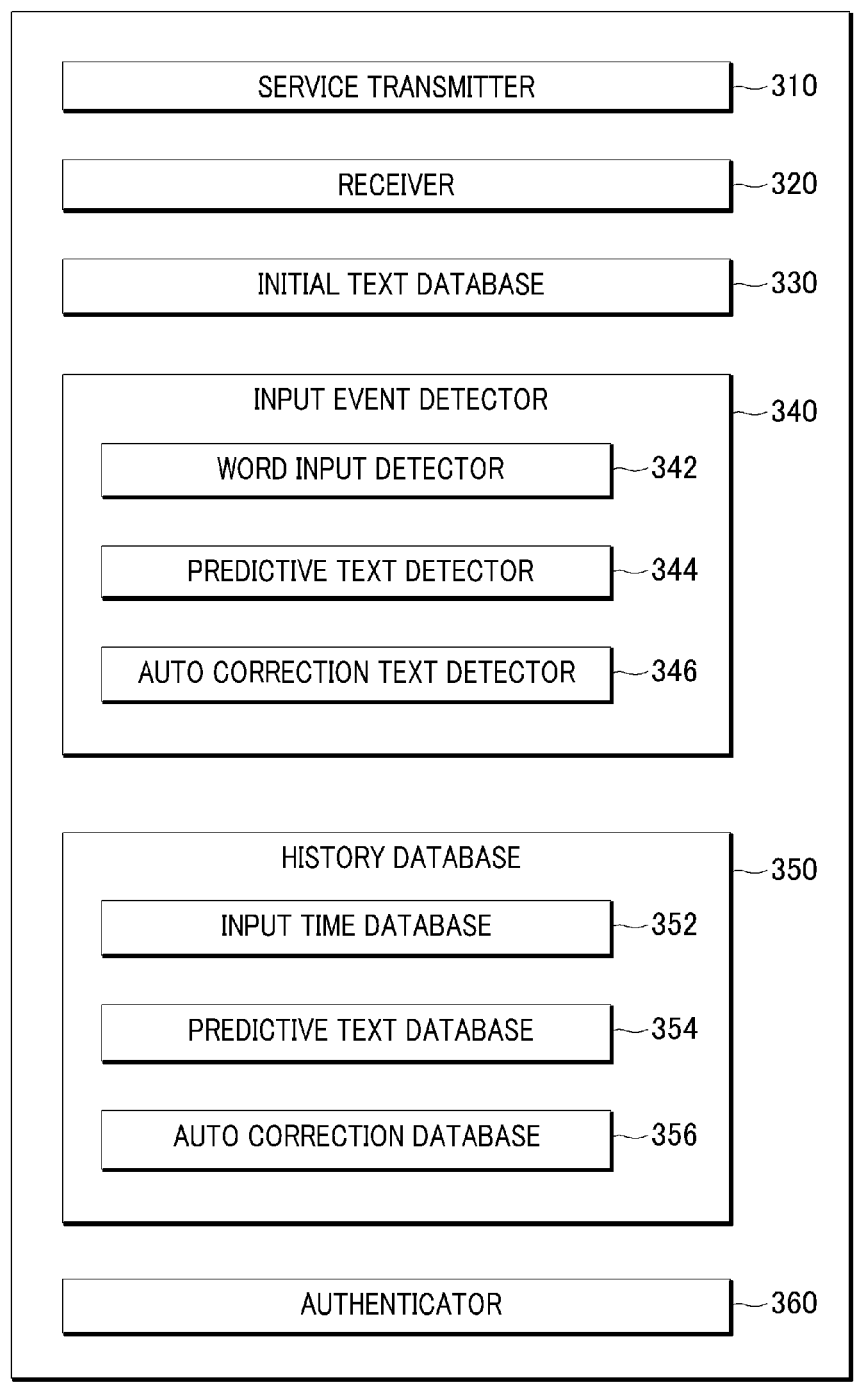

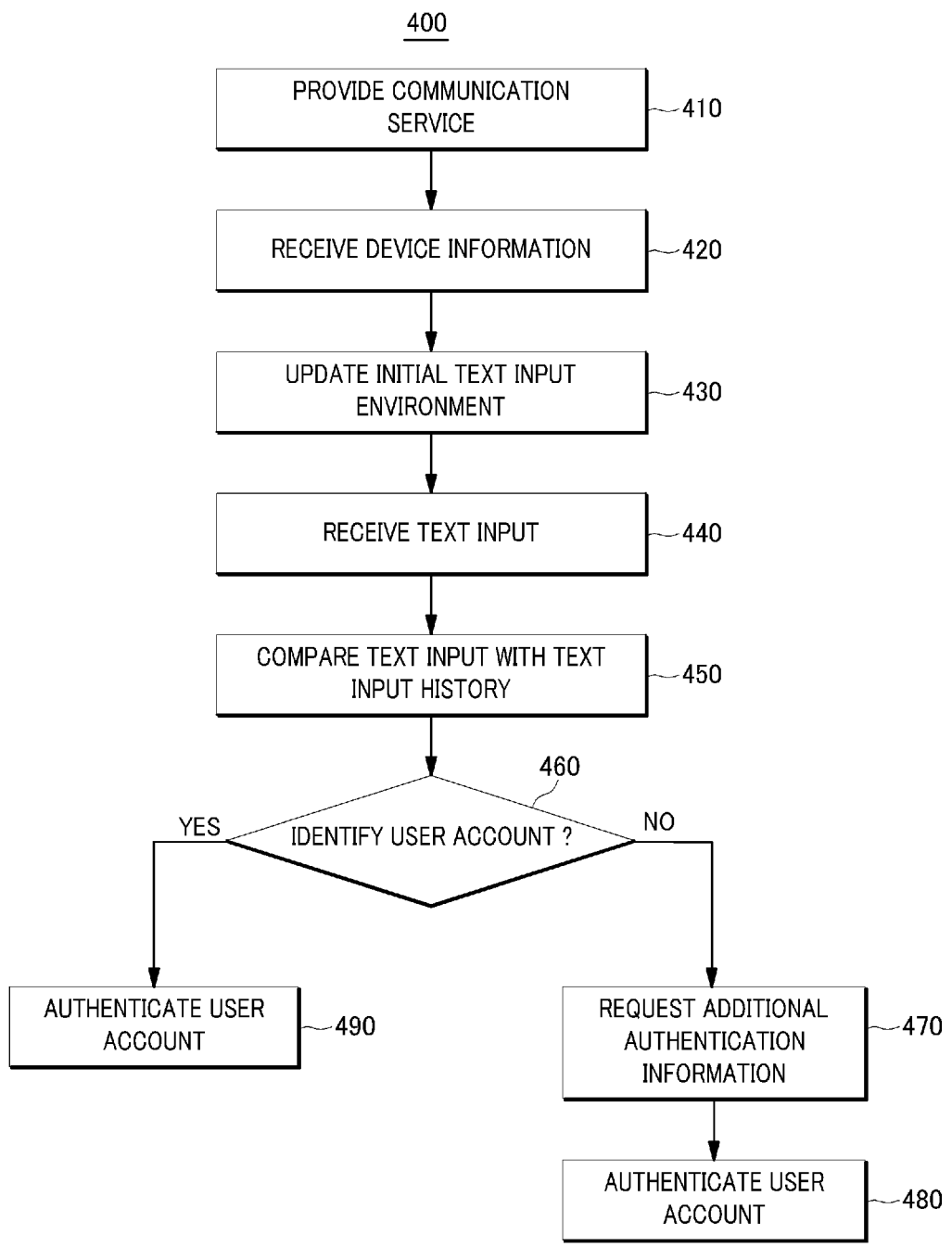

CONTINUOUS USER AUTHENTICATION

BACKGROUND

Mobile user terminals such as smart phones nowadays are very popular. They may offer supports for an increasing number of applications such as web browsers, e-mail clients, applications for editing documents, taking pictures, and so on. This increase of capabilities and usage may create needs to improve the security of these devices. Recently, for the purpose of the improvement of security, service providers are paying more and more attention how to more efficiently provide accurate and high-speed authentications for users.

SUMMARY

In an example, a method performed under control of a server may include providing a communication service to an end device; receiving, from the end device, a text input, while providing the communication service; and authenticating a user account associated with the end device, based on the received text input, while providing the communication service.

In another example, a server may include a service transmitter configured to provide a communication service to an end device; a receiver configured to receive, from the end device, a text input, while the service transmitter providing the communication service; and an authenticator configured to authenticate a user account associated with the end device, based on the received text input, while the service transmitter providing the communication service.

In yet another example, a computer-readable storage medium having stored thereon computer-executable instructions that, in response to execution, may cause a server to perform operations including: providing a communication service to an end device; receiving, from the end device, a text input, while providing the communication service; and authenticating a user account associated with the end device, based on the received text input, while providing the communication service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 2A to 2C schematically show illustrative example text input history data, arranged in accordance with at least some embodiments described herein;

FIG. 3 shows a schematic block diagram illustrating an example architecture for a server, arranged in accordance with at least some embodiments described herein;

FIG. 4 schematically shows an example flow diagram of a process of a server for authenticating user account, arranged in accordance with at least some embodiments described herein;

DETAILED DESCRIPTION

Figure 1:
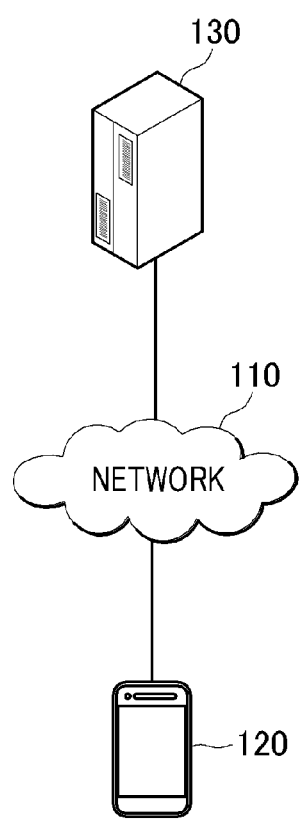
FIG. 1 schematically shows an illustrative example of an environment including an end device and a server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a user account authenticating scheme. Technologies are generally described for a method for receiving text inputs from an end device, while communication services are being provided to the end device and authenticating a user account associated with the end device based on the received text inputs and text input history corresponding to the end device, while the communication services are being provided to the end device. So, it is possible to perform continuous, simple and high-speed user account authenticating, whenever a text input is received from an end device.

In some examples, a server may be configured to provide a communication service to an end device via a network. As non-limiting examples of the communication service may include a social networking service (SNS), an on-line game service, an internet protocol television (IPTV) service, a user chat service, a data upload and download service, etc. A user of the end device having a user account may make a text input, and the end device may be configured to transmit the text input to the server whenever the text input is made. The server may be further configured to receive the text input while providing the communication service. For example, but not as a limitation, the text input may include a word input, a predictive text input or an auto correction text input.

The server may be still further configured to compare the received text input with a text input history stored in a memory of the server. The server may be configured to store and/or accumulate the text input history in association with the user account whenever the server receives the text input. Further, the server may be configured to evaluate a likelihood of the user account based on the received text input and the text input history, and to determine whether the evaluated likelihood is smaller than a predefined threshold value.

If the evaluated likelihood is determined to be smaller than the predefined threshold value, the server may request for the end device to transmit additional authentication information of the end device, such as a user identifier or a password for accessing the communication service. Otherwise if the evaluated likelihood is determined to be equal to or greater than the predefined threshold value, the server may authenticate the user account associated with the end device.

Since the server may accumulate a text input history in association with each user account authenticated on each end device, the server may be configured to identify each user account based on text inputs received from each end device associated with the user account. Further, each end device, specifically an operating system (OS), a web browser or an application installed on the end device, may have respective learning functions for text inputs. Thus, although a user uses different user accounts at an end device, the server may be configured to determine that the same user makes text inputs and the text inputs are received from the same end device. Further, the server may be configured to identify the user account of the end device whenever the server receives text inputs from the end device. Thus, the server may be configured to authenticate the user account continuously and quickly, while providing communication services to the end device.

FIG. 1 schematically shows an illustrative example of an environment 10 including an end device 120 and a server 130, arranged in accordance with at least some embodiments described herein. As illustrated in FIG. 1, end device 120 and server 130 may be communicatively connected to each other via a network 110.

Network 110 may include, as non-limiting examples, wireless networks such as a mobile radio communication network, including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), Bluetooth, or the like.

End device 120 may include, for example, but not as a limitation, a notebook computer, a personal computer, a smart phone, a smart television, a digital camera, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and WiBro (Wireless Broadband Internet) terminal.

As non-limiting examples, server 130 may refer to one or more apparatuses or servers hosted and/or supported by a service providing organization or entity that provides network or online communication services to multiple end devices including end device 120. In some embodiments, server 130 may be installed on a cloud layer.

In some embodiments, server 130 may be configured to provide a communication service to end device 120 via network 110. As non-limiting examples of the communication service may include a social networking service (SNS), an on-line game service, a user chat service, a web browsing service, an internet protocol television (IPTV) service, a data upload and download service, etc.

End device 120 may be configured to receive the communication service from server 130. In some embodiments, a user may access the communication service via a web browser installed on end device 120. End device 120, specifically the web browser, may send, to server 130, user agent information of Hypertext Transfer Protocol (HTTP) protocol indicating at least one of an operating system (OS) version, a web browser version and setting options, such as locale or cipher strength.

The user of end device 120 may make a text input while the communication service is being executed on end device 120. Further, end device 120 may be configured to transmit the text input to server 130, while receiving the communication service.

For example, but not as a limitation, the text input may include a word input, a predictive text input or an auto correction text input. As referenced herein, a predictive text may allow for an entire word to be inputted by a single key press or key touching. The predictive text may make efficient use of fewer device keys to make a word input into a text message, an e-mail, an address book, a calendar, and the like. Further, an auto correction may be a spell checker to correct common spelling or typing errors, saving time for a user. The auto correction may be also used to automatically format text or insert special characters by recognizing particular character usage.

Server 130 may be configured to receive the text input from end device 120 whenever the text input is generated by the user of end device 120, while providing the communication service to end device 120.

Server 130 may be further configured to receive, from end device 120, the user agent information that may include the OS version and/or web browser version. Server 130 may be further configured to update an initial text input environment hosted on server 130, which is associated with end device 120, based on the received user agent information. The initial text input environment may refer to an initial state in which there is no learned or recommended text input. Each end device, specifically an operating system (OS), a web browser or an application installed on each end device, may have respective learning functions for text inputs. For example, each end device may provide and/or recommend a word that has been inputted most recently. In some embodiments, server 130 may be configured to update an initial predictive text input environment or an initial auto correction text input environment of end device 120.

In some embodiments, when server 130 receives the text input from end device 120, server 130 may be configured to determine whether the text input corresponds to one of text input events that may include a word input event, a predictive text input event or an auto correction text input event. For example, server 130 may be configured to determine that the text input corresponds to a word input event, if multiple characters have been inputted one by one as a result of multiple key pressing or touching and if a word has been inputted by the input of the respective characters. Further, server 130 may be configured to determine that the text input corresponds to a predictive text input event, if a word has been newly inputted once (i.e., at a time). Further, server 130 may be configured to determine that the text input corresponds to an auto correction text input event, if a word that had already been inputted has been changed to a new word at a time.

Server 130 may be further configured to store, in a database, the received text input in association with the determined text input event whenever server 130 receives the text input, so that server 130 may generate a text input history. For example, the database may be a local memory of server 130 or may be an external database, such as a cloud datacenter, communicatively coupled to server 130. In some embodiments, server 130 may be configured to store a required time to receive the text input as a part of the text input history, along with the text input (e.g., a word itself), when the determined text input event includes a word input event. For example, server 130 may be configured to measure an average time taken from beginning to end of receiving the text input (e.g., a word), and to store the measured average time (i.e., the required time). Further, server 130 may be configured to store a frequency of the text input event input as a part of the text input history, along with the text input (e.g., a word itself), when the determined text input event includes a predictive text input event. Server 130 may be still further configured to store a frequency of the text input event input as a part of the text input history, along with the text input (e.g., a word itself), when the determined text input event includes an auto correction text input event.

Further, server 130 may be configured to store, in the database, the received text input further in association with a user account associated with end device 120 so as to generate the text input history. So, a text input history may be accumulated in the database in association with respective one of user accounts of multiple end devices.

In some embodiments, server 130 may be configured to authenticate a user account that is associated with end device 120, based on the received text input, while server 130 providing the communication service to end device 120. Specifically, server 130 may be configured to compare the received text input with a text input history that may be stored in a database, whenever server 130 receives the text input. Further, server 130 may be configured to identify the user account of end device 120 based on the comparison result.

In some embodiments, server 130 may be configured to evaluate a likelihood of the user account of end device 120 based on the received text input and the text input history. Specifically, server 130 may be configured to evaluate a likelihood of the user account of end device 120 based on at least one of a type of the text input event, the frequency of the text input event or the required time to receive the text input. For example, server 130 may be configured to produce a relatively great likelihood value when the received text input includes a word that is generated by a predictive text input event and has a relatively great frequency in the text input history. For another example, server 130 may be configured to produce a relatively low likelihood value when the received text input includes a word that is generated by a word input event but has a required time which is discord with a required time stored in the text input history.

Further, server 130 may be configured to determine whether the evaluated likelihood is smaller than a predefined threshold value. If the evaluated likelihood is determined to be smaller than the predefined threshold value, server 130 may be configured to transmit, to end device 120, a request to transmit, to server 130, additional authentication information of end device 120. As non-limiting examples, the additional authentication information of end device 120 may include at least one of a user identifier or a password of end device 120 for accessing the communication services. Further, server 130 may be configured to authenticate the user account of end device 120, when the additional authentication information of end device 120 is validated.

Otherwise, if the evaluated likelihood is determined to be equal to or greater than the predefined threshold value, server 130 may be configured to identify and/or authenticate the user account associated with end device 120.

Since server 130 may be configured to accumulate a text input history in association with each user account associated with each end device, server 130 may be configured to identify and/or authenticate each user account based on text inputs received from each end device associated with the user account. Further, each end device, specifically an operating system (OS), a web browser or an application installed on the end device, may have respective learning functions for text inputs. Thus, although a user uses different user accounts at one end device, server 130 may be configured to determine that the same user makes text inputs and the text inputs are received from the same end device. Further, server 130 may be configured to identify the user account of end device 120 whenever server 130 receives a text input from end device 120. Thus, server 130 may be configured to authenticate the user account associated with end device 120 continuously and quickly, while providing the communication service to end device 120.

FIGS. 2A to 2C schematically show illustrative example text input history data, arranged in accordance with at least some embodiments described herein. In some embodiments, server 130 may be configured to determine whether a text input corresponds to one of text input events that may include a word input event, a predictive text input event or an auto correction text input event, when server 130 receives the text input from end device 120. For example, server 130 may be configured to detect a word input event, if multiple characters have been inputted one by one to generate a word. Further, server 130 may be configured to detect a predictive text input event, if a word is newly inputted once (i.e., at a time). Further, server 130 may be configured to detect an auto correction text input event, if a word that had already been inputted has been changed to a new word at a time.

Server 130 may be configured to generate a text input history in a database. Server 130 may be configured to store, in a database, the received text input in association with respective type of the text input event. Further, server 130 may be configured to store, in the database, the received text input further in association with respective user account associated with each end device.

In some embodiments, server 130 may be configured to store, in association with respective user account, a required time to receive the text input as a part of the text input history, along with the text input (e.g., a word itself), when a word input event is detected. For example, server 130 may be configured to measure an average time taken from beginning to end of receiving the text input (e.g., a word), and to store the measured average time as the required time. Further, server 130 may be configured to store, in association with respective user account, a frequency of the text input event input as a part of the text input history, along with the text input (e.g., a word itself), when a predictive text input event or an auto correction text input event is detected.

For example, as depicted in FIG. 2A, server 130 may be configured to store text input history data 210 that indicates respective user account (e.g., identifiers of user accounts), words that have been inputted by a predictive text input event and frequencies of respective one of the words (i.e., frequencies of the predictive text input event).

Further, for example, as depicted in FIG. 2B, server 130 may be configured to store text input history data 220 that indicates respective user account (e.g., identifiers of user accounts), words that have been inputted by an auto correction text input event and frequencies of respective one of the words (i.e., frequencies of the auto correction text input event).

Further, for example, as depicted in FIG. 2C, server 130 may be configured to store text input history data 230 that indicates respective user account (e.g., identifiers of user accounts), words that have been inputted by a word input event and a required time to receive respective one of the words (i.e., an average time taken from beginning to end of receiving respective one of the words).

FIG. 3 shows a schematic block diagram illustrating an example architecture for a server, arranged in accordance with at least some embodiments described herein. As depicted in FIG. 3, server 130 may include a service transmitter 310, a receiver 320, an initial text database 330, an input event detector 340, a history database 350 and an authenticator 360. Further, as depicted in FIG. 3, input event detector 340 may include a word input detector 342, a predictive text detector 344 and an auto correction text detector 346. Further, as depicted in FIG. 3, history database 350 may include an input time database 352, a predictive text database 354 and an auto correction database 356. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of service transmitter 310, receiver 320, initial text database 330, input event detector 340, history database 350 and authenticator 360 may be included in an instance of an application hosted on server 130.

Service transmitter 310 may be configured to provide a communication service to end device 120 via network 110. As non-limiting examples of the communication service may include a social networking service (SNS), an on-line game service, a user chat service, a web browsing service, an internet protocol television (IPTV) service, a data upload and download service, etc.

Receiver 320 may be configured to receive, from end device 120, user agent information that may include an OS version of end device 120 and/or a web browser version of a browser installed on end device 120.

Further, receiver 320 may be configured to receive a text input from end device 120 whenever the text input is generated by a user of end device 120, while service transmitter 310 providing the communication service to end device 120. In some embodiments, the user of end device 120 may make a text input while the communication service is being executed on end device 120. Further, end device 120 may be configured to transmit the text input to receiver 320, while receiving the communication service. For example, but not as a limitation, the text input may include a word input, a predictive text input or an auto correction text input.

Initial text database 330 may be configured to store an initial text input environment in association with each end device including end device 120. Each end device, specifically an operating system (OS), a web browser or an application installed on each end device, may have respective learning functions for text inputs. The initial text input environment may refer to an initial state in which there is no learned or recommended text input. In some embodiments, initial text database 330 may be configured to store at least one of an initial predictive text input environment or an initial auto correction text input environment.

Further, initial text database 330 may be configured to update the initial text input environment hosted on server 130 based on the user agent information received by receiver 320. In some embodiments, initial text database 330 may be configured to update the initial predictive text input environment and/or the initial auto correction text input environment of end device 120.

Input event detector 340 may be configured to determine a type of a text input event to which the received text input corresponds. The type of the text input event may include a word input event, a predictive text input event or an auto correction text input event.

In some embodiments, word input detector 342 may be configured to detect a word input event, if multiple characters have been inputted one by one as a result of multiple key pressing or touching and if a word has been inputted by the input of the multiple characters.

In some embodiments, predictive text detector 344 may be configured to detect a predictive text input event, if a word has been newly inputted once (i.e., at a time).

In some embodiments, auto correction text detector 346 may be configured to detect an auto correction text input event, if a word that had already been inputted has been changed to a new word at a time.

History database 350 may be configured to store a text input history in association with each user account associated with each end device. Further, history database 350 may be configured to store the received text input in association with respective type of text input events as a part of the text input history.

In some embodiments, input time database 352 may be configured to store a required time for receiver 320 to receive the text input as a part of the text input history, along with the text input (e.g., a word itself), when the text input event is a word input event. For example, input time database 352 may be configured to measure an average time taken from beginning to end of receiving the text input (e.g., a word), and to store the measured average time as the required time.

In some embodiments, predictive text database 354 may be configured to store a frequency of the text input event input as a part of the text input history, along with the text input (e.g., a word itself), when the text input event is a predictive text input event.

In some embodiments, auto correction database 356 may be configured to store a frequency of the text input event input as a part of the text input history, along with the text input (e.g., a word itself), when the text input event is an auto correction text input event.

Authenticator 360 may be configured to authenticate a user account that is associated with end device 120, based on the received text input, while service transmitter 310 providing the communication service to end device 120. Specifically, authenticator 360 may be configured to compare the received text input with the text input history that may be stored in history database 350, whenever receiver 320 receives the text input. Further, authenticator 360 may be configured to identify the user account of end device 120 based on the comparison result.

In some embodiments, authenticator 360 may be configured to evaluate a likelihood of the user account of end device 120 based on the received text input and the text input history. Specifically, authenticator 360 may be configured to evaluate a likelihood of the user account of end device 120 based on at least one of the type of the text input event, the frequency of the text input event or the required time to receive the text input.

Further, authenticator 360 may be configured to determine whether the evaluated likelihood is smaller than a predefined threshold value. If the evaluated likelihood is determined to be smaller than the predefined threshold value, authenticator 360 may be configured to transmit, to end device 120, a request to transmit additional authentication information of end device 120. As non-limiting examples, the additional authentication information of end device 120 may include at least one of a user identifier or a password of end device 120 for accessing the communication services. Further, authenticator 360 may be configured to authenticate the user account of end device 120, when the additional authentication information of end device 120 is validated.

Otherwise, if the evaluated likelihood is determined to be equal to or greater than the predefined threshold value, authenticator 360 may be configured to authenticate the user account associated with end device 120.

FIG. 4 schematically shows an example flow diagram of a process 400 of a server for authenticating user account, arranged in accordance with at least some embodiments described herein. The process in FIG. 4 may be implemented in environment 10 including end device 120 and server 130, as illustrated in FIG. 1. An example process may include one or more operations, actions, or functions as illustrated by one or more blocks 410, 420, 430, 440, 450, 460, 470, 480 and/or 490. Although illustrated as discrete blocks, various blocks may be divided into additional blocks, combined into fewer blocks, or eliminated, depending on the desired implementation. Processing may begin at block 410.

At block 410 (Provide Communication Service), server 130 may provide a communication service to end device 120 via network 110. As non-limiting examples, the communication service may include a social networking service (SNS), an on-line game service, a user chat service, a web browsing service, an internet protocol television (IPTV) service, a data upload and download service, etc. Processing may proceed from block 410 to block 420.

At block 420 (Receive Device Information), server 130 may receive, from end device 120, device information that may include at least one of an OS version of end device 120, a web browser version of a browser installed on end device 120 or setting options, such as locale or cipher strength. Processing may proceed from block 420 to block 430.

At block 430 (Update Initial Text Input Environment), server 130 may update an initial text input environment hosted on server 130 based on the device information received at block 420. Server 130 may store an initial text input environment in association with each end device including end device 120. Each end device, specifically an operating system (OS), a web browser or an application installed on each end device, may have respective learning functions for text inputs. The initial text input environment may refer to an initial state in which there is no learned or recommended text input. In some embodiments, initial text database 330 may store at least one of an initial predictive text input environment or an initial auto correction text input environment. At block 430, server 130 may update the initial predictive text input environment and/or the initial auto correction text input environment of end device 120. Processing may proceed from block 430 to block 440.

At block 440 (Receive Text Input), server 130 may receive a text input from end device 120 whenever the text input is generated by a user of end device 120, while server 130 providing the communication service to end device 120. In some embodiments, the user of end device 120 may make a text input while the communication service is being executed on end device 120. Further, end device 120 may transmit the text input to receiver 320, while receiving the communication service. For example, but not as a limitation, the text input may include a word input, a predictive text input or an auto correction text input.

At block 440, server 130 may also determine whether the received text input corresponds to one of text input events including a word input event, a predictive text input event or an auto correction text input event. In some embodiments, server 130 may detect a word input event, if multiple characters have been inputted one by one by to generate a word. In some other embodiments, server 130 may detect a predictive text input event, if a word has been newly inputted once (i.e., at a time). In some other embodiments, server 130 may detect an auto correction text input event, if a word that had already been inputted has been changed to a new word at a time.

Further, at block 440, server 130 may store, in a database, the received text input in association with a user account of end device 120 and respective one of the types of text input events, so as to generate a text input history. In some embodiments, server 130 may store a required time to receive the text input as a part of the text input history, along with the text input (e.g., a word itself), when the text input event is a word input event. For example, the required time may refer to an average time taken from beginning to end of receiving the text input (e.g., a word). In some other embodiments, server 130 may store a frequency of the text input event input as a part of the text input history, along with the text input (e.g., a word itself), when the text input event is a predictive text input event. In some other embodiments, server 130 may store a frequency of the text input event input as a part of the text input history, along with the text input (e.g., a word itself), when the text input event is an auto correction text input event. Processing may proceed from block 440 to block 450.

At block 450 (Compare Text Input With Text Input History), server 130 may compare the text input, which is received at block 440, with the text input history that may be stored in the database, while server 130 providing the communication service to end device 120. In some embodiments, at block 450, server 130 may evaluate a likelihood of the user account of end device 120 based on the received text input and the text input history. Specifically, server 130 may evaluate a likelihood of the user account of end device 120 based on at least one of the type of the text input event, the frequency of the text input event or the required time to receive the text input. Processing may proceed from block 450 to block 460.

At block 460 (Identify User Account), server 130 may determine whether the user account of end device 120 is identified based on the comparison result produced at block 450. In some embodiments, at block 460, server 130 may determine whether the likelihood, which is evaluated at block 450, is smaller than a predefined threshold value. If server 130 fails to identify the user account of end device 120 (i.e., server 130 determines that the evaluated likelihood is smaller than the predefined threshold value), processing may proceed to block 470, while otherwise (i.e., the evaluated likelihood is equal to or greater than the predefined threshold value and server 130 identifies the user account of end device 120), processing may proceed to block 490.

At block 470 (Request Additional Authentication Information), server 130 may request for end device 120 to transmit additional authentication information of end device 120 to server 130. As non-limiting examples, the additional authentication information of end device 120 may include at least one of a user identifier or a password of end device 120 for accessing the communication services. Processing may proceed from block 470 to block 480.

At block 480 (Authenticate User Account), server 130 may validate the additional authentication information of end device 120, and may authenticate the user account of end device 120 based on the validated additional authentication information.

At block 490 (Authenticate User Account), server 130 may authenticate the user account associated with end device 120, if the evaluated likelihood is determined to be equal to or greater than the predefined threshold value.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
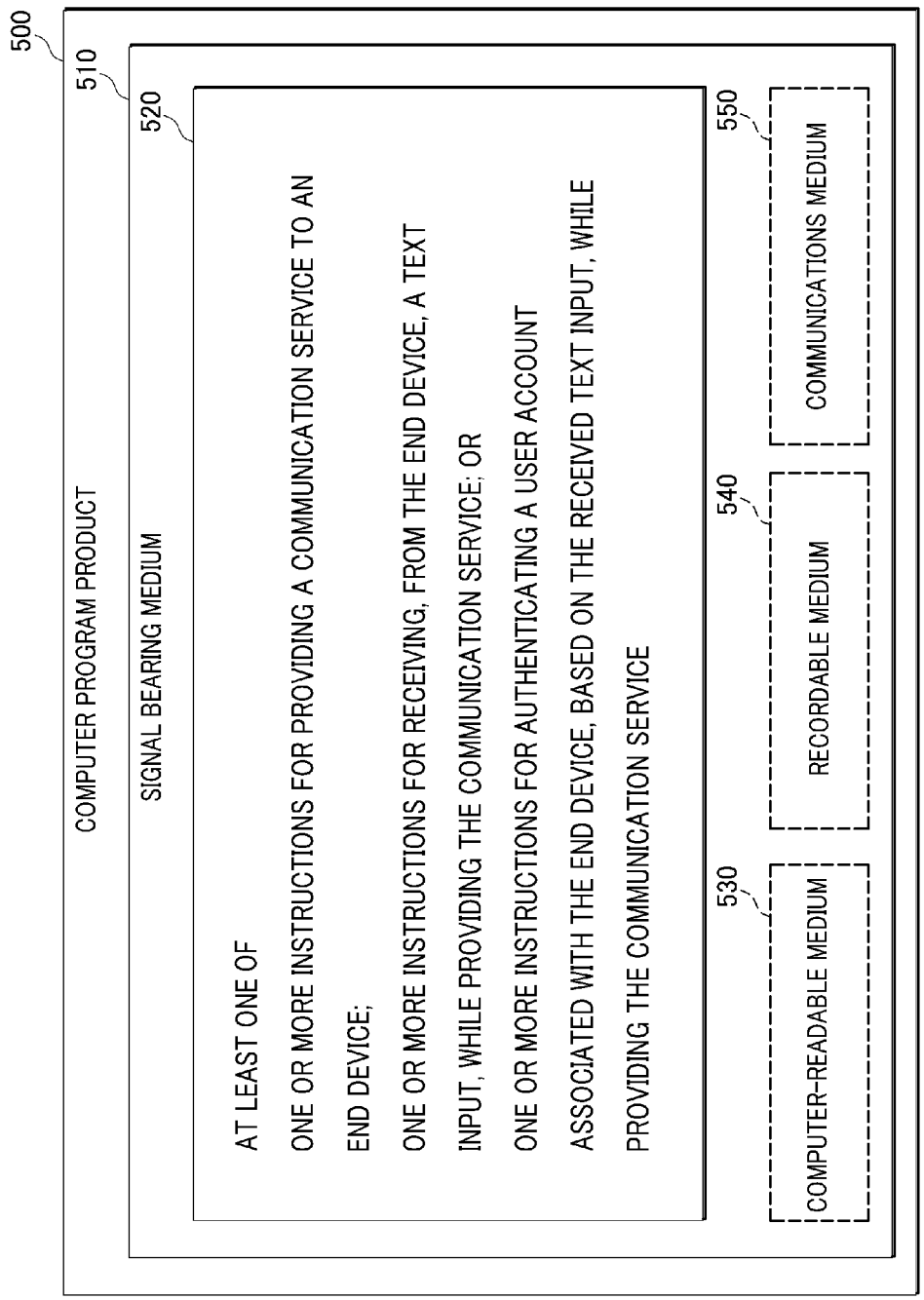
FIG. 5 illustrates a computer program product that may be utilized to provide a user account authenticating scheme, arranged in accordance with at least some embodiments described herein.

FIG. 5 illustrates a computer program product that may be utilized to provide a user account authenticating scheme, arranged in accordance with at least some embodiments described herein. Computer program product 500 may include a signal bearing medium 510. Signal bearing medium 510 may include one or more instructions 520 that, when executed by, for example, a processor, may provide the functionality described above with respect to FIGS. 1-4. By way of example, instructions 520 may include: one or more instructions for providing a communication service to an end device; one or more instructions for receiving, from the end device, a text input, while providing the communication service; or one or more instructions for authenticating a user account associated with the end device, based on the received text input, while providing the communication service. Thus, for example, referring to FIG. 3, server 130 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, computer program product 500 may be conveyed to one or more modules of server 130 by an RF signal bearing medium 510, where the signal bearing medium 510 is conveyed by a wireless communications medium 550 (e.g., a wireless communications medium conforming with the IEEE 802.11 standard).

Figure 6:
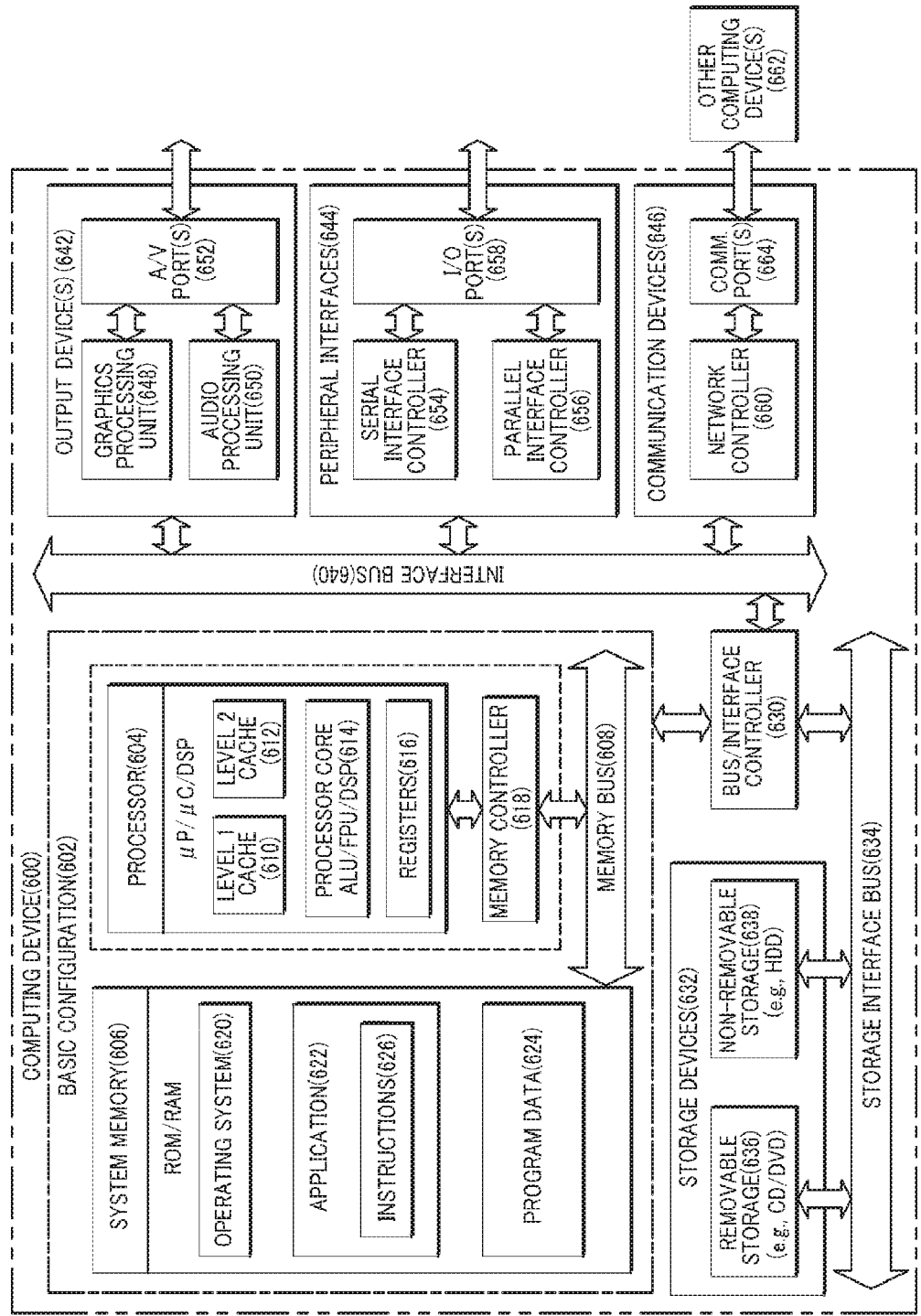
FIG. 6 is a block diagram illustrating an example computing device that may be utilized to provide a user account authenticating scheme, arranged in accordance with at least some embodiments described herein.

FIG. 6 is a block diagram illustrating an example computing device that may be utilized to provide a user account authenticating scheme, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, an application 622, and program data 624. Application 622 may include instructions 626 that may be arranged to perform the functions as described herein including the actions described with respect to server 130 architecture as shown in FIG. 3 or including the actions described with respect to the flow charts shown in FIG. 4. In some examples, application 622 may be arranged to operate with program data 624 on an operating system 620 such that the schemes for authenticate a user account.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a server, comprising:
    providing a communication service to an end device;
    receiving, from the end device, a text character input, while providing the communication service, wherein the text character input includes a predictive text input or an auto correction text input;
    authenticating a user account associated with the end device by comparing the received text character input to a stored text input history, while providing the communication service; and
    identify the user account based on a positive result of the comparison of the received text character input to the stored text input history.

2. The method of claim 1, wherein the text character input includes at least a portion of a word input.

3. The method of claim 1, wherein the authenticating includes:
    evaluating a likelihood of the user account being authenticated as being associated with the end device based on the received text character input and a text input history that has been accumulated in association with the user account in a database; and
    determining whether the likelihood is smaller than a predefined threshold value,
    wherein the method further comprises:
        transmitting, to the end device, a request to transmit additional authentication information of the end device when the likelihood is determined to be smaller than the predefined threshold value.

4. The method of claim 3, wherein the additional authentication information of the end device includes at least one of a user identifier or a password.

5. The method of claim 1, further comprising:
    determining whether the text character input corresponds to one of text input events, wherein a text input event may be any one of a text character input event, a predictive text input event, or an auto correction text input event; and
    storing, in the database, the received text character input in association with the determined text input event, so as to generate the text input history.

6. The method of claim 5, wherein the storing includes at least one of:
    storing a frequency of the text input event, when the determined text input event is the predictive text input event or the auto correction text input event, or storing a required time to receive the text input, when the determined text input event includes the text character input event.

7. The method of claim 6, wherein the authentication of the user account is further based on at least one of a type of the text input event, the frequency of the text input event or the required time to receive the text character input.

8. The method of claim 1, further comprising:
    receiving, from the end device, information that identifies at least one of an operating system (OS) version of the end device or a browser version of a browser installed on the end device; and
    updating an initial text input environment associated with the end device and hosted on the server, based on the received information.

9. A server, comprising:
    a service transmitter configured to provide a communication service to an end device;
    a receiver configured to receive, from the end device, a text character input, while the service transmitter is providing the communication service;
    an initial text database configured to store an initial text input environment in association with the end device;
    a history database configured to store a text input history in association with a user account associated with the end device;
    an account authenticator configured to, while the service transmitter is providing the communication service, authenticate the user account associated with the end device, by comparing the received text character input to the text input history stored in the history database;
    an input event detector configured to determine a type of a text input event to which the text character input received to the initial text database corresponds, wherein the input event detector includes:
        a predictive text detector configured to detect a predictive text input event for the text character input received to the initial text database; and
        an auto correction text detector configured to detect an auto correction text input event for the text character input received to the initial text database.

10. The server of claim 9, wherein the input event detector includes:
    a word input detector configured to detect a word input event to which the text character input received to the initial text database corresponds.

11. The server of claim 9,
    wherein the authenticator is configured to:
    evaluate a likelihood of the user account, based on the received text character input and the text input history,
    determine whether the likelihood is smaller than a predefined threshold value, and
    transmit, to the end device, a request to transmit additional authentication information of the end device when the likelihood is determined to be smaller than the predefined threshold value.

12. The server of claim 9,
    wherein the text character input is a word input, and
    wherein the history database includes:
        an input time database configured to store a required time for the receiver to receive the text character input.

13. The server of claim 9,
    wherein the text character input is a predictive text input, and
    wherein the history database includes:
        a predictive text database configured to store a frequency of the text character input.

14. The server of claim 9,
    wherein the text character input is an auto correction text input, and
    wherein the history database includes:
        an auto correction database configured to store a frequency of the text character input.

15. The server of claim 9, wherein the receiver is further configured to receive, from the end device, information that indicates at least one of an operating system (OS) version of the end device or a browser version of a browser installed on the end device,
    wherein the initial text database is further configured to update the initial text input environment based on the received information.

16. A non-transitory computer-readable storage medium having stored thereon computer-executable instructions that, in response to execution, cause a server to perform operations, comprising:
provide a communication service to an end device;
receiving, from the end device, a text character input, while providing the communication service, wherein the text character input includes a predictive text input or an auto correction text input;
authenticating a user account associated with the end device by comparing the received text character input to a stored text input history, while providing the communication service; and
identify the user account based on a positive result of the comparison of the received text character input to the stored text input history.

* * * * *